March 2, 1926.

J. W. REYNOLDS

MOVABLE HEADLIGHT

Filed May 27, 1925

J. W. Reynolds
INVENTOR

BY Victor J. Evans
ATTORNEY

March 2, 1926.
J. W. REYNOLDS
MOVABLE HEADLIGHT
Filed May 27, 1925
1,575,505
2 Sheets-Sheet 2
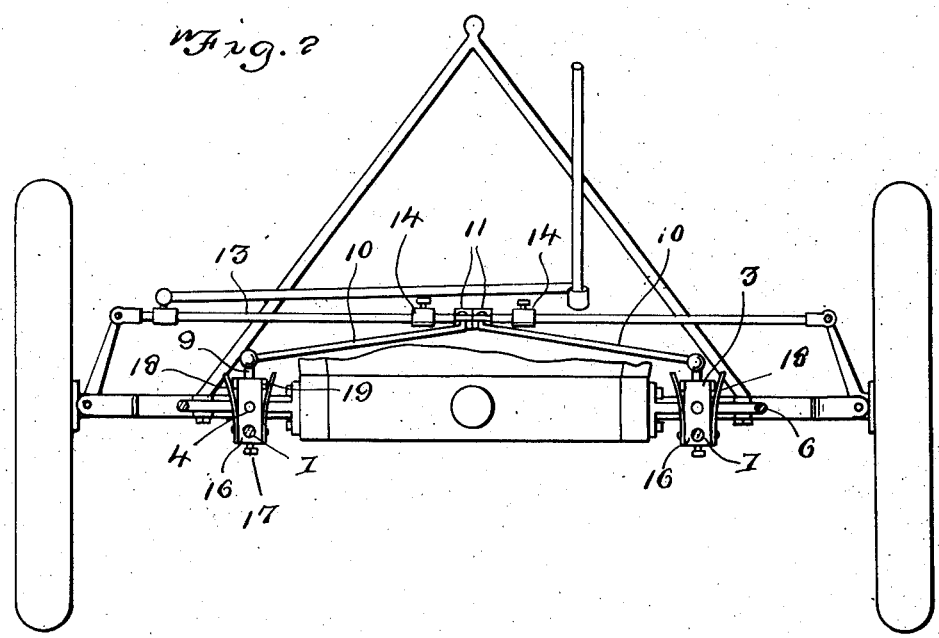
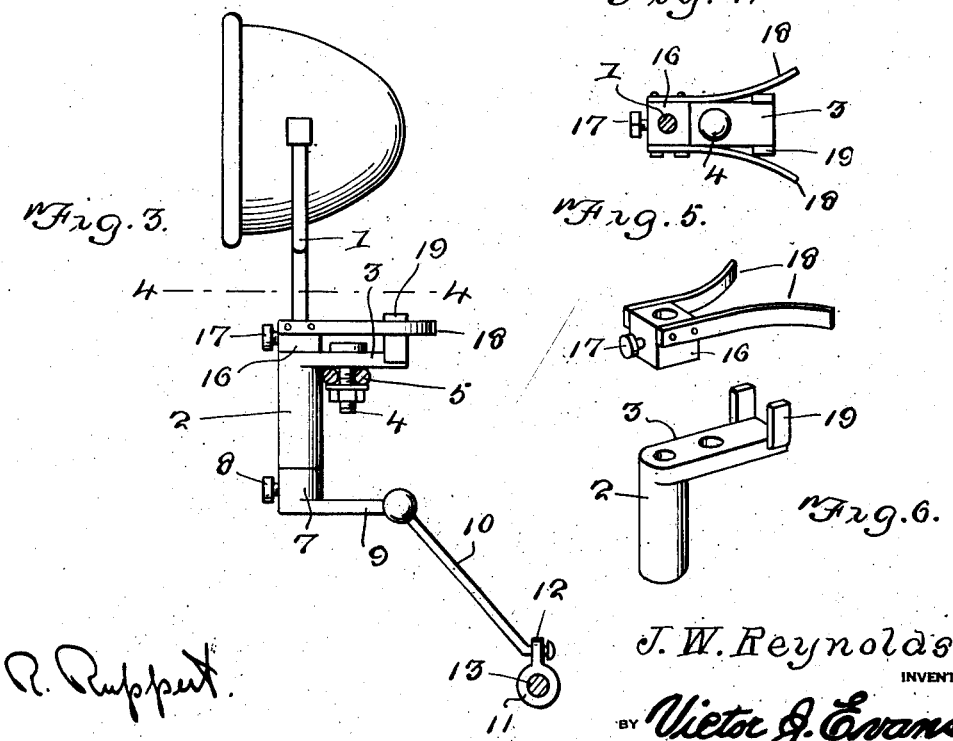

Patented Mar. 2, 1926.

1,575,505

UNITED STATES PATENT OFFICE.

JOHN W. REYNOLDS, OF ST. LOUIS, MISSOURI.

MOVABLE HEADLIGHT.

Application filed May 27, 1925. Serial No. 33,238.

*To all whom it may concern:*

Be it known that I, JOHN W. REYNOLDS, a citizen of the United States, residing at St. Louis, in the county of St. Louis City, and State of Missouri, have invented new and useful Improvements in Movable Headlights, of which the following is a specification.

This invention relates to a dirigible headlight for motor vehicles, the general object of the invention being to provide means for causing the rays of light from the lamps to follow the road on curves as well as on straight portions so as to fully illuminate the road at all times.

Another object of the invention is to so form the parts of the invention that the invention can be applied to existing models of vehicles with but little change thereto.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which:—

Figure 2 is a plan view of a front portion of an automobile, showing parts of the invention.

Figure 3 is a section on line 3—3 of Figure 1.

Figure 4 is a section on line 4—4 of Figure 3.

Figure 5 is a perspective view of the spring carrying block.

Figure 6 is a perspective view of the supporting member of a lamp standard.

Figure 1:
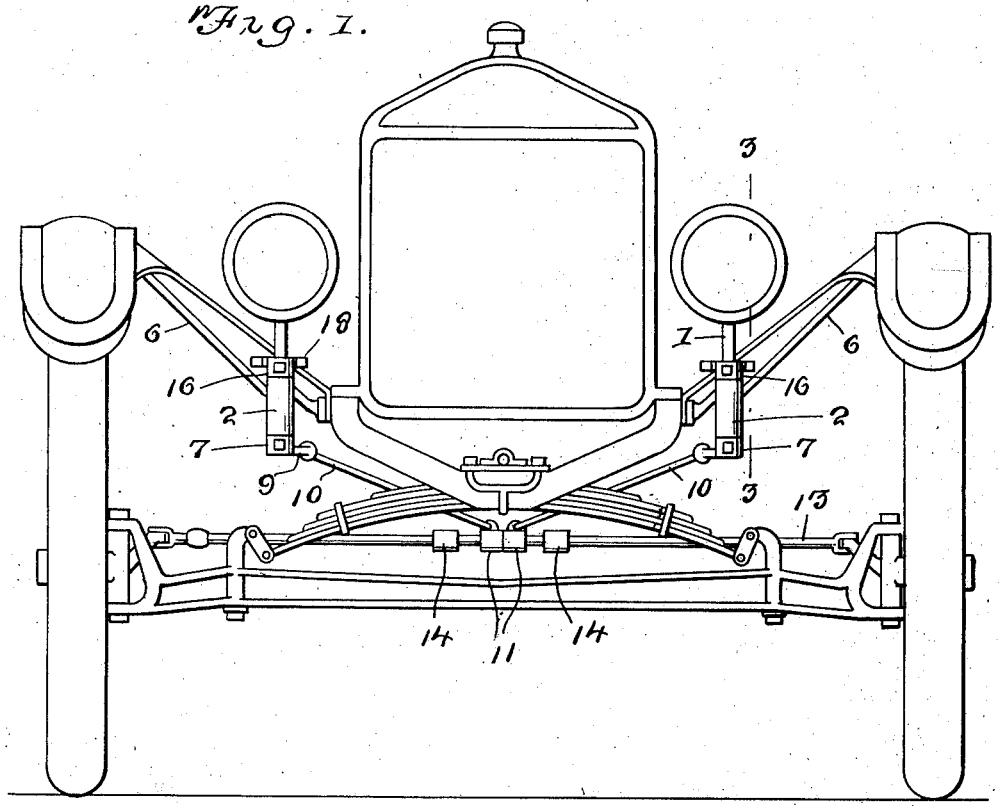
Figure 1 is a front view of an automobile showing the invention in use.
Figure 7:
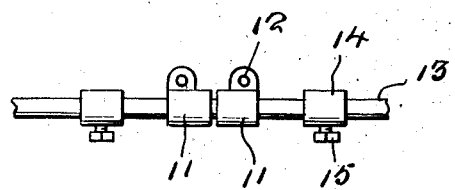
Figure 7 is a view of a part of the steering rod, with the collars and sleeves thereon.

As shown in these views, I remove the ordinary lamp standards and replace them by the straight standards 1 which are carried by the tubular members 2, each member 2 having an arm 3 at its upper end through which a bolt 4 passes which also passes through the ring-shaped part 5 of the fender brace 6, this ring part 5 ordinarily supporting the lamp standard of the vehicle, but in this case, it receives the bolt which fastens the tubular member 2 in position. A collar 7 is fastened to the lower end of the lamp standard 1 by means of the set screw 8, this collar engaging the lower end of the tubular member 2. The collar is provided with an arm 9 to which is swiveled a link 10, the links being connected to the sleeves 11 by means of the eyes 12 on the sleeves and said sleeves are slidably mounted on the connecting rod 13 of the steering mechanism of the vehicle. The sleeves are limited in their movement by means of the collars 14 which are held on the rod 13 by the set screws 15. Thus the rod 13 must be positively moved, as in a turning movement of the vehicle, before the sleeves 11 will be moved to cause the links 10 to actuate the arms 9 and the collars 7 to partially rotate the lamp standards and thus shift the rays of light from straight ahead to one side of the vehicle so that they will light the road on the curve the vehicle is taking. This arrangement will prevent movement of the lamps through the ordinary play of the parts from vibrations as the vehicle travels straight ahead.

A block 16 is attached to each standard by means of the set screw 17 and each block carries a pair of spring strips 18 which are of curved formation and which normally engage a pair of ears 19 on each arm 3. These springs, engaging the ears on the stationary arm 3, will also act to prevent movement of the lamp standards and of the lamps under the ordinary play of the parts as the springs must be bent in order to turn the standard in one direction or the other so that the springs will tend to prevent movement of the standard. However, when the standard is turned under the turning movement of the vehicle, the spring will give to permit the standard to be turned.

From the foregoing, it will be seen that I have provided an arrangement of parts whereby the lamps may be turned on the turning movement of the vehicle, so that the rays of light will illuminate the road at all times. The invention can be placed on vehicles with but little change to the parts thereof and the parts forming the invention can be manufactured to sell at low cost.

It is thought from the foregoing description that the advantages and novel features of my invention will be readily apparent.

I desire it to be understood that I may make changes in the construction and in the combination and arrangement of the several parts, provided such changes fall within the scope of the appended claim.

What I claim is:—

In combination with a motor vehicle and its headlamps, a tubular member through which each standard of each lamp passes, an arm on each tubular member adapted to be bolted to a fender brace of the vehicle, a pair of ears on each arm, a pair of springs connected with each standard and engaging the ears for preventing rotary movement of the standard, an arm connected with the lower end of each standard, a link swiveled to each arm, a pair of sleeves slidably mounted on the connecting rod of the steering mechanism of the vehicle and to which the links are connected and collars fastened to the rod and causing the sleeves to move with the rod when the rod has been moved in the turning movement of the vehicle.

In testimony whereof I affix my signature.

JOHN W. REYNOLDS.